(12) United States Patent
Heida

(10) Patent No.: US 11,072,503 B1
(45) Date of Patent: Jul. 27, 2021

(54) DISCARDING RAIL FOR UNLOADING MATERIAL FROM A CONTINUOUSLY MOVING CONVEYOR BELT

(71) Applicant: Jason Heida, Murrieta, CA (US)

(72) Inventor: Jason Heida, Murrieta, CA (US)

( * ) Notice: Subject to any disclaimer, the term of this patent is extended or adjusted under 35 U.S.C. 154(b) by 0 days.

(21) Appl. No.: 16/860,772

(22) Filed: Apr. 28, 2020

(51) Int. Cl.
| | |
|---|---|
| *B65G 39/12* | (2006.01) |
| *B65G 65/02* | (2006.01) |
| *B65G 15/08* | (2006.01) |
| *B65G 65/23* | (2006.01) |
| *B65G 65/00* | (2006.01) |

(52) U.S. Cl.
CPC .............. *B65G 65/02* (2013.01); *B65G 39/12* (2013.01); *B65G 65/005* (2013.01)

(58) Field of Classification Search
None
See application file for complete search history.

(56) References Cited

U.S. PATENT DOCUMENTS

| | | | | |
|---|---|---|---|---|
| 3,856,133 A * | 12/1974 | Dyachkov | ............... | B65G 39/12 |
| | | | | 198/831 |
| 4,461,378 A * | 7/1984 | Roth | ............... | B65G 17/02 |
| | | | | 198/370.04 |
| 5,056,655 A * | 10/1991 | Justice | ............... | E21F 13/02 |
| | | | | 198/812 |
| 5,341,920 A * | 8/1994 | Riffe | ............... | B65G 39/12 |
| | | | | 198/825 |
| 6,390,287 B2 * | 5/2002 | Riffe | ............... | B65G 39/125 |
| | | | | 198/806 |
| 6,695,131 B2 * | 2/2004 | Swinderman | ............... | B65G 15/08 |
| | | | | 198/827 |
| 6,811,023 B1 * | 11/2004 | Christiana | ............... | B65G 17/10 |
| | | | | 198/818 |
| 7,997,406 B2 * | 8/2011 | Schafer | ............... | B65G 21/10 |
| | | | | 198/861.3 |
| 8,985,317 B2 * | 3/2015 | Martin | ............... | B65G 15/60 |
| | | | | 198/828 |
| 10,118,765 B2 * | 11/2018 | Ragan | ............... | B65G 39/10 |
| 10,457,505 B2 * | 10/2019 | Kilic | ............... | B65G 65/28 |
| 10,865,052 B2 * | 12/2020 | Hou | ............... | B65G 43/02 |
| 2011/0139073 A1 * | 6/2011 | Reed | ............... | C23C 14/568 |
| | | | | 118/729 |

* cited by examiner

*Primary Examiner* — Kavel Singh
(74) *Attorney, Agent, or Firm* — Perkins Coie LLP; Colin Fowler

(57) ABSTRACT

A discarding rail system for unloading waste material on a conveyor belt in continuous motion and method for using said system are disclosed. According to some embodiments, the system includes (1) an upper assembly for support the underside of a conveyor belt, (2) a actuation mechanism for inclining the upper assembly so that the conveyor belt is pivoted to one side, creating a gradient causing content on the conveyor belt to roll of the side of the conveyor belt, and (3) a set of retaining devices positioned on the side of the conveyor belt to hold conveyor belt in place as the conveyor belt is pivoted.

19 Claims, 8 Drawing Sheets

DISCARDING RAIL FOR UNLOADING MATERIAL FROM A CONTINUOUSLY MOVING CONVEYOR BELT

TECHNICAL FIELD

This disclosure relates to materials crushing, and more specifically, to a technique and a device for unloading material or debris from a conveyor belt at a designated drop-off zone.

BACKGROUND

In aggregate production, rocks are fed into a hydraulic crusher for breakage and then transported to a vertical shaft impactor for impact crushing to create a more finely grained aggregate material. FIG. 1 displays a typical scheme of the aggregate production process with the aggregate being transported from the hydraulic crusher 102 to the vertical shaft impactor 104 via an inclined conveyor system 106. After a period of operations, the hydraulic crusher 102 may accumulate a large deposit of waste material that must be removed. Timely and frequent maintenance of the machinery and removal of the waste material is critical as the failure to do so could cause damage the equipment, particularly to the vertical shaft impactor, which is a piece of high collateral equipment and is not easily replaceable.

The scheme for maintaining the machinery and removing the waste material requires the whole system to be shut down so that multiple locations throughout the system can be locked and maintained simultaneously. The waste material must then be scaled and discarded to chutes and discharge belts for removal. As most of the system is locked out for other maintenance tasks, the current means of removing the waste material is to run the full length of the conveyor belt to load the waste material onto the conveyor belt, then have workmen scale the inclined conveyor belt and manually shovel the waste off the conveyor belt to the ground below 108 along the entire length of the conveyor belt. The manual process must be repeated multiple cycles until the waste material is completely removed. For example, at some facilities, this process may take four to five employees two to three hours each day to complete the clearing task. Not only does this manual process result in efficient use of manpower and wastage of energy as the conveyor belt must go through multiple start-stop cycles, this process poses a safety risk for the workmen on the conveyor system as well as workmen on the ground who may be passing by as waste material is shoveled off the conveyor system. Needless to elaborate, such schemes are usually not in compliance with governmental safety regulations, such as those promulgated Mine Safety and Health Administration (MSHA) and Occupational Safety and Health Administration (OSHA). In the past, the MSHA and OSHA have proposed measures such as installing additional catwalks, hooking lanyard tethers to the workmen, and adding elevators to help the workmen reach their locations on the conveyor belt, such measures are insufficient in at least three regards. First, the suggested measures still require workmen to perform their job from a high altitude, which bears an inherent safety risk. Second, the waste material still must be shoveled off the entire length of the belt, thus posing a risk to the men working below. Third, this scheme still operates inefficiently, as discussed above—it requires extra manpower and energy wastage to complete.

DETAILED DESCRIPTION

Figure 1:
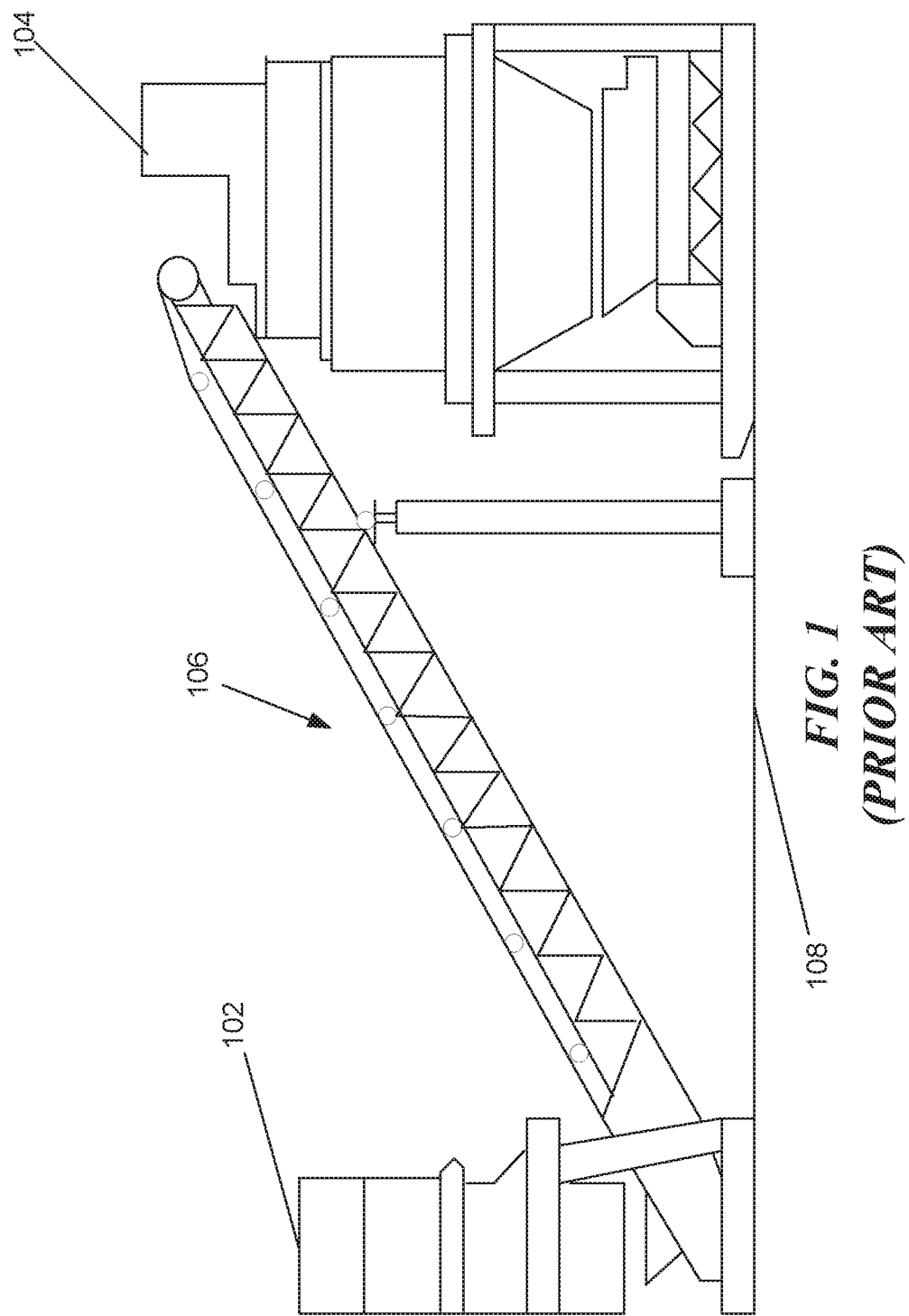
FIG. 1 is a diagram of a currently existing aggregate production line.

The disclosed embodiments include a system and method for resolving the above-described safety risk and inefficiencies. The discarding rail ("D-Rail") is a support structure positioned within a conveyor belt that actuates and warps the conveyor belt. The warped conveyor belt discards material thereon to a predetermined location. Materials conveyor belts are often positioned between two processing machines. Examples of processing machines include crushers and impactors. Materials are broken down in stages as is appropriate for each processing machine. The first machine. A first materials processor receives large chunks of material and break those large chunks into smaller rubble. The smaller rubble is transported by conveyor belt to a second materials processor that breaks the rubble into fine matter.

Some portions of the rubble are undesirable. The undesirable portions must be removed from the conveyor before reaching the materials processor that renders the rubble into fine matter (and therefore more difficult to separate). The D-rail enables a process whereby the conveyor belt discards the rubble to a predetermined location.

The D-rail is positioned similarly as other support rollers for the conveyor belt. Actuation of the D-rail is performed by an actuation/driving mechanism. Examples of suitable actuation mechanisms include a screw drive, a hydraulic drive, a pneumatic drive, or an electric drive. In some embodiments, implementations including a hydraulic drive, or a pneumatic drive make use an actuating piston to drive the lifting arms. An electric drive may be implemented in multiple ways. In some embodiments, to apply an electric drive to a design with screw drive, the implementation includes either a sprocket or pulley on the end of a drive nut. The drive nut may be designed with a keeper pin to be taken off and replaced or attach other apparatuses. The electric drive may further include a motor mount on side of conveyor structure to drive by chain or belt. A third way, is to replace the screw with an actuating piston to drive the lifting arms in a similar manner as either hydraulic or pneumatic drive systems.

According to an embodiment, the system including (1) an upper assembly for support the underside of a conveyor belt, (2) a rail device for inclining the upper assembly so that the conveyor belt is warped to one side creating a gradient/funnel that causes content on the conveyor belt to roll of the side of the conveyor belt, and (3) a set of retaining devices positioned on the side of the conveyor belt to hold conveyor belt in place as the conveyor belt is pivoted.

An object of the D-rail system is to be able to unload the waste material from the conveyor belt without workmen having to manually remove the waste material and be able to quickly remove the waste material, preferably by continuously running the conveyor belt as the D-rail system unloads the waste material. Another object of the D-rail system is to allow a conveyor system equipped with the D-rail system to easily toggle between normal production mode and unloading operations without significant impedance. Thus, in some embodiments, the D-rail system is an apparatus that is integrated as part of the production system and will not require reinstallation or additional equipment each time that the D-rail system is put into operations.

Figure 2:
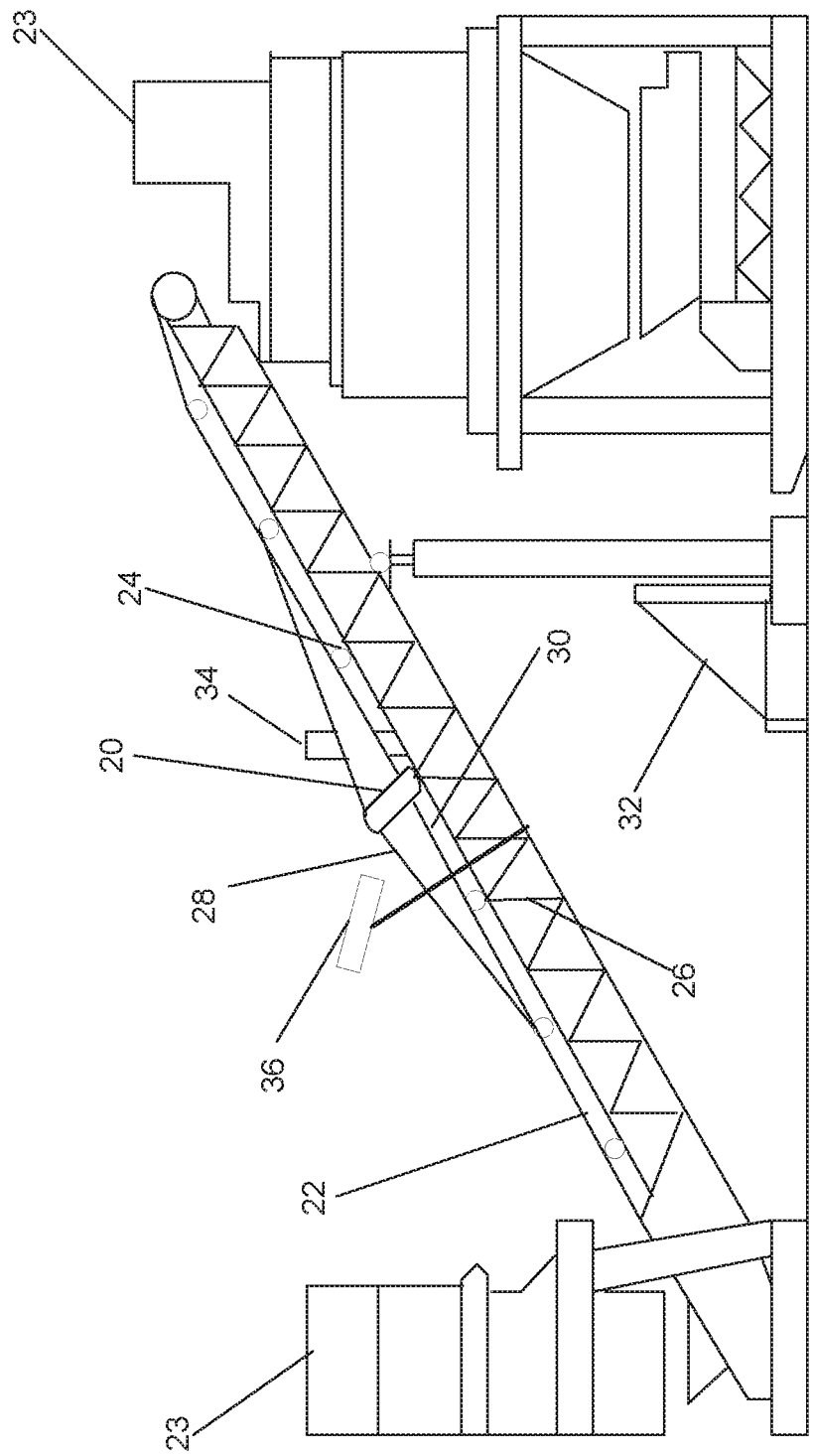
FIG. 2 is a side view of an aggregate production line with a discarding rail system installed for unloading waste material from the conveyor belt.

FIG. 2 is a side view of an aggregate production line with a discarding rail (D-Rail) system 20 installed for unloading waste material from the conveyor belt 22 between two materials processors 23. An embodiment of the D-rail system 20 installed in place of a support roller 24. This D-rail system 20 accomplishes the above-described objects. FIG. 2 portrays the D-rail system 20 in an actuated state. While the D-rail 20 is in a deactivated/non-actuated state does not interfere with the normal production runs of the conveyor system, thus allowing the normal production to proceed unimpeded.

The D-rail 20 has a similar profile as other support rollers 24 while the D-rail 20 is not activated. The conveyor belt 22 is a flexible material that that tracks the conveyor structure 26 as guided the support rollers 22. The conveyor belt 22 travels over the support rollers 22 and the D-rail 20.

Figure 4:
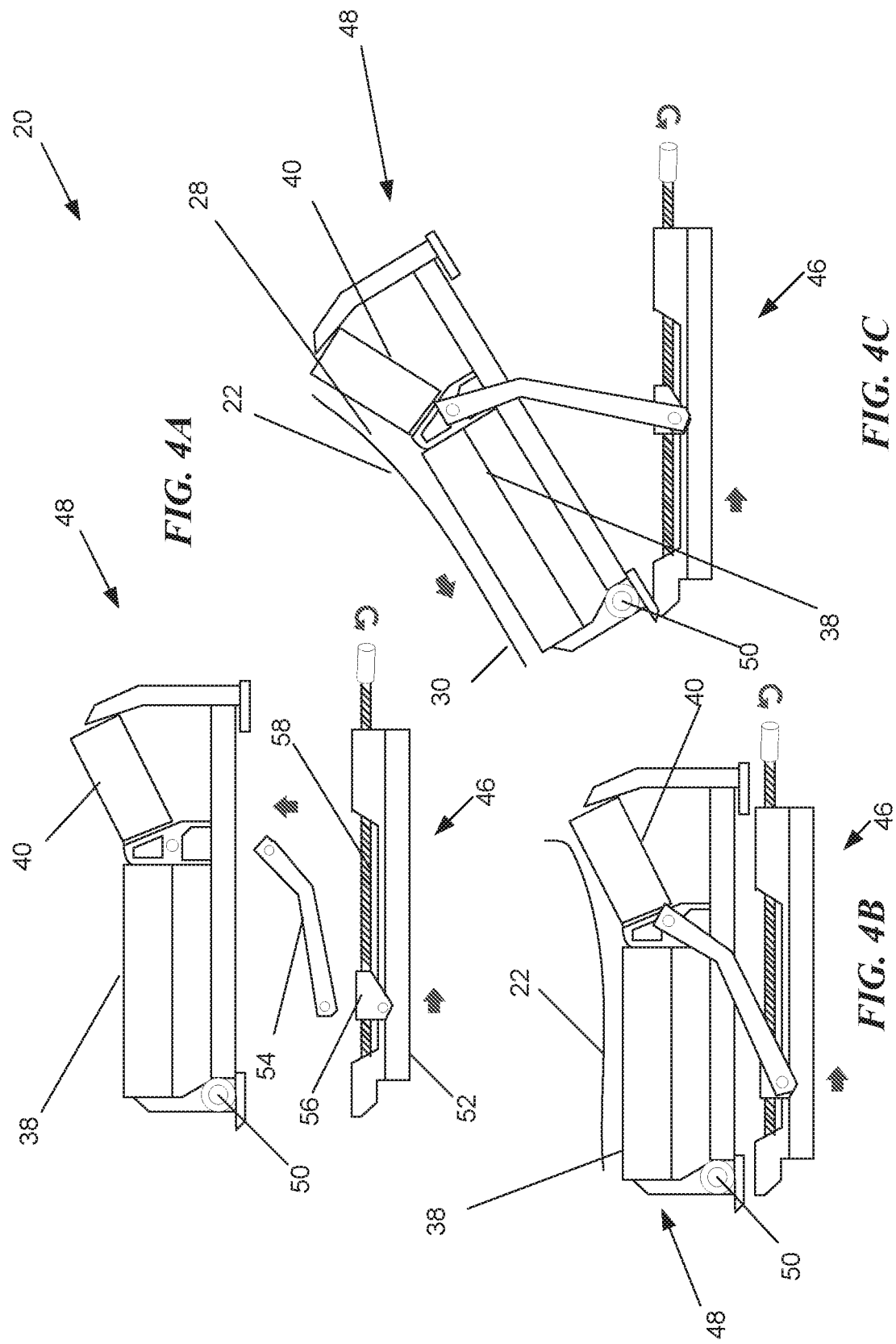
FIGS. 4A-C are cross-sectional views of an embodiment of the discarding rail device.

When activated/actuated, the D-rail 20 pivots about a hinge in a plane perpendicular to the direction of flow of the conveyor belt 22. The hinge (see FIG. 4) is positioned on either the right or left side of the conveyor belt 22. Actuating the D-rail 20 warps the conveyor belt 22 and creates a high point 28 and a low point 30 on either side of the conveyor belt 22 at the D-rail 20. Material on the conveyor belt 22 slides off the conveyor belt 22 from the high side 28 to the low side 30 and lands in a receptacle 32 positioned below the conveyor structure 26.

In some configurations, warping the conveyor belt 22 causes the conveyor belt 22 instable with respect to the conveyor structure 26 and support rollers 24. Accordingly, a retaining pillar 34 is positioned close to the D-rail and prevents the conveyor belt 22 from slipping off the conveyor structure 26 and support rollers 24.

In some embodiments, the conveyor structure 26 further includes a camera 36 aimed at a region of the conveyor belt 22 that warps in response to actuation of the D-rail 20. Images collected by the camera are subjected to a computer vision analysis that detects features of undesirable material. Features of undesirable material may be identified by average rubble size, color, sedimentary or other rock patterns within the material. When undesirable material is detected via computer vision analysis of camera output, the D-rail 20 is automatically actuated to discard the undesirable material.

Figure 3:
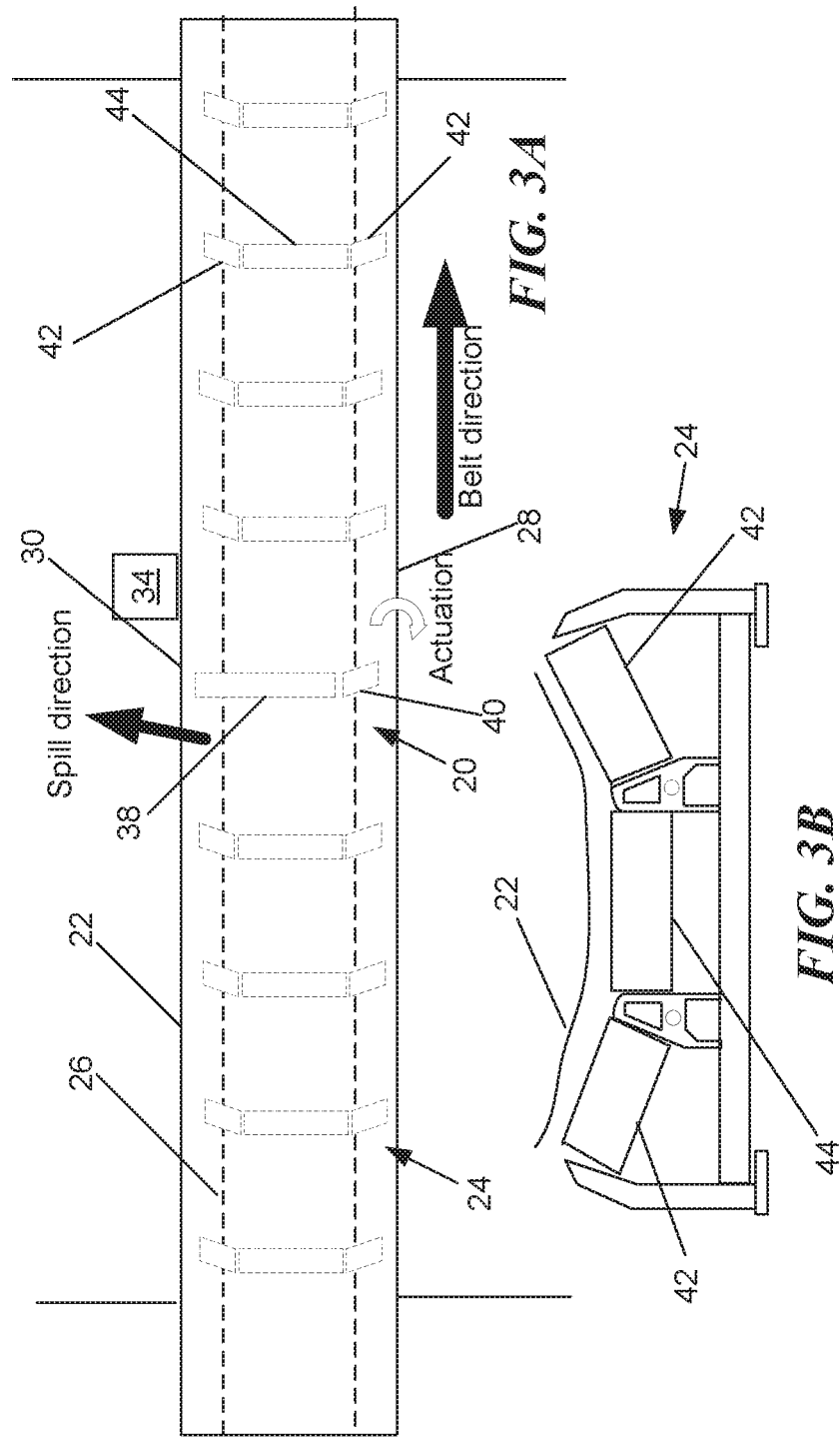
FIG. 3A is a top view of the aggregate conveyor system with the discarding rail system installed.
FIG. 3B is a side view of a support roller.

FIG. 3A is a top view of the materials conveyor system with the D-rail system 20 installed. FIG. 3B is a side view of a support roller 22. The two figures portray a roller configuration for both a support roller 24 and the D-rail 20.

In some embodiments, the D-rail 20 includes a long roller 38 and a short roller 40. The long roller 38 is oriented horizontally and supports the conveyor belt 22. The long roller 38 is positioned adjacent to the low side 30 and the hinge (not shown). The short roller 40 is oriented at an offset angle relative to a horizontal plane. The offset angle causes the conveyor belt 22 to operate in a canal-like shape on the high side 28. The short roller 40 is positioned adjacent to the high side 28 and opposite the hinge (not shown). The long roller 38 may be assembled using multiple rollers. In some embodiments, the low side 30 of the D-rail 20 does not have an elevated "canal" edge in order to facilitate discarding of materials. Some embodiments of the D-rail 20 are a simple bar, without rollers, that actuates.

The support rollers 22 include a combination of angled rollers 42 and a horizontal roller 44. The combination of rollers causes the conveyor belt 22 to operate in a canal shape. The horizontal roller 44 supports a base, and the angled rollers 42 form canal-edges. While the D-rail 20 is actuated, the combination of the angled rollers 42 of the respective support rollers 24 closest to the D-rail 20, and the lack of an angled roller 42 on the low side 30 of the D-rail 20, generates a funnel that guides discarded material off the conveyor belt 22.

The activated D-rail system 20 pivots the conveyor belt 22 and creates, along the designated section, a gradient that is perpendicular to the conveyor belt's direction of travel. As a result, waste material that is transported to the designated section of the conveyor belt 22 will slide off the conveyor belt 22 and fall to a designated drop off zone. For instance, in designing the rail for pivoting the conveyor belt, one may take into consideration factors such as the strength of the conveyor belt 22, weight of the load, and surface area or curvature of the upper assembly's surface in order to reduce tension on and abrasion to the conveyor belt 22 to improve its longevity.

FIGS. 4A-C are cross-sectional views of an embodiment of the discarding rail device. A person having ordinary skill in the art will readily appreciate that, depending on various design considerations, the D-rail system 20 can take various physical forms and it can be actuated by different means.

FIG. 4A shows a partially exploded view of an actuation mechanism 46 and the upper rail assembly 48. In this embodiment, the upper rail assembly is hingeably connected to the actuation mechanism 46. The actuation mechanism 46 is connected to the conveyor structure 26. at one end, a long roller 38 supports the underside of the conveyor belt and is positioned adjacent to the hinge 50, a short roller 40 helps retain the conveyor belt in place and channel material sitting on the edge of the conveyor belt 22 towards the center of the belt. In some embodiments, the rollers 38, 40 facilitate movement of the conveyor belt and reduce friction between the D-rail system 20 and the conveyor belt 22.

However, it is not necessary for the D-rail system 20 to have rollers. It is conceivable that the rollers 38, 40 can be replaced with other components which reduce friction between the upper assembly and the conveyor belt 22. In this embodiment, the two rollers attached to the frame via attachment points. However, it is possible to have some embodiments with a single roller 38 that only supports the bottom of the conveyor belt, or to have multiple smaller rollers on a piece of curved rod that both supports the bottom of the rail and retains the side of the conveyor belt.

FIG. 4A also shows a partially exploded view of the actuation mechanism 46 for inclining the upper assembly 48. According to this embodiment, the actuation mechanism 46 comprises a housing 52, a connecting arm 54, and a drive mechanism 56 on a rail 58 for actuating the connecting arm 54 to lift the upper assembly 48. In this embodiment, the drive mechanism 56 is a bearing sleeved over the screw shaft rail 58. One end of the connecting arm 54 is connected to the bearing drive mechanism 56 and the other end is connected to the upper assembly 48. By rotating the screw shaft rail 58, the screw bearing 56 actuates the connecting arm 54 to incline and decline the upper assembly 48. As described above, there are many ways of actuating the D-rail system 20 other than using a screw shaft rail 58. In some other embodiments, the mechanism for actuating the connecting arm along the rail can also be accomplished by a hydraulic or pneumatic drive.

FIGS. 4B and 4C display the upper assembly 46 and the actuation mechanism 46 in an assembled state and installed on the conveyor structure (not pictured). FIG. 4B shows the D-rail system 20 while inactive. The connecting arm 54 and the upper assembly 48 are set to a flat position when inactive enabling the conveyor belt 22 to be used normally. FIG. 4C displays the upper assembly 48 and the actuation mechanism 46 when activated. While activated, the connecting arm 54 is raised to incline the upper assembly 46, thus pivoting the conveyor belt 22 and unloading any content on the conveyor belt 22.

Figure 5:
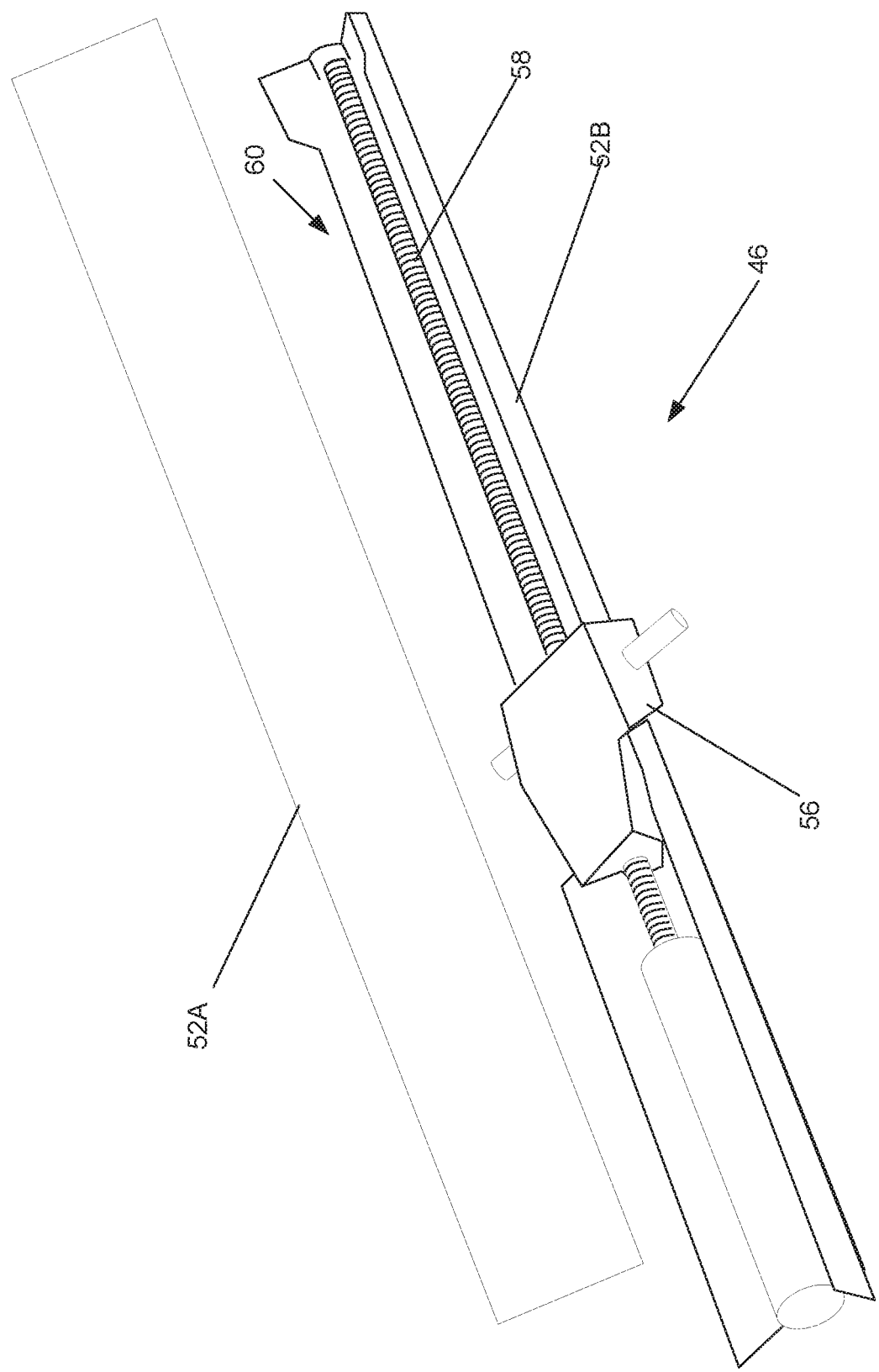
FIG. 5 is perspective view of the drive mechanism of the discarding rail device.

FIG. 5 is perspective view of the actuation mechanism 46 of the D-rail 20. The housing 52 is portrayed in two components, an upper housing 52A and a lower housing 52B. The two housing components 52A, 52B seal the rotating the screw shaft rail 58, the screw bearing 56 inside with a gap 60 that enables the screw bearing 56 interact with the connecting arm 54. The housing 52 prevents debris from getting into the actuation mechanism 46 and cause clogs or jams.

Figure 6:
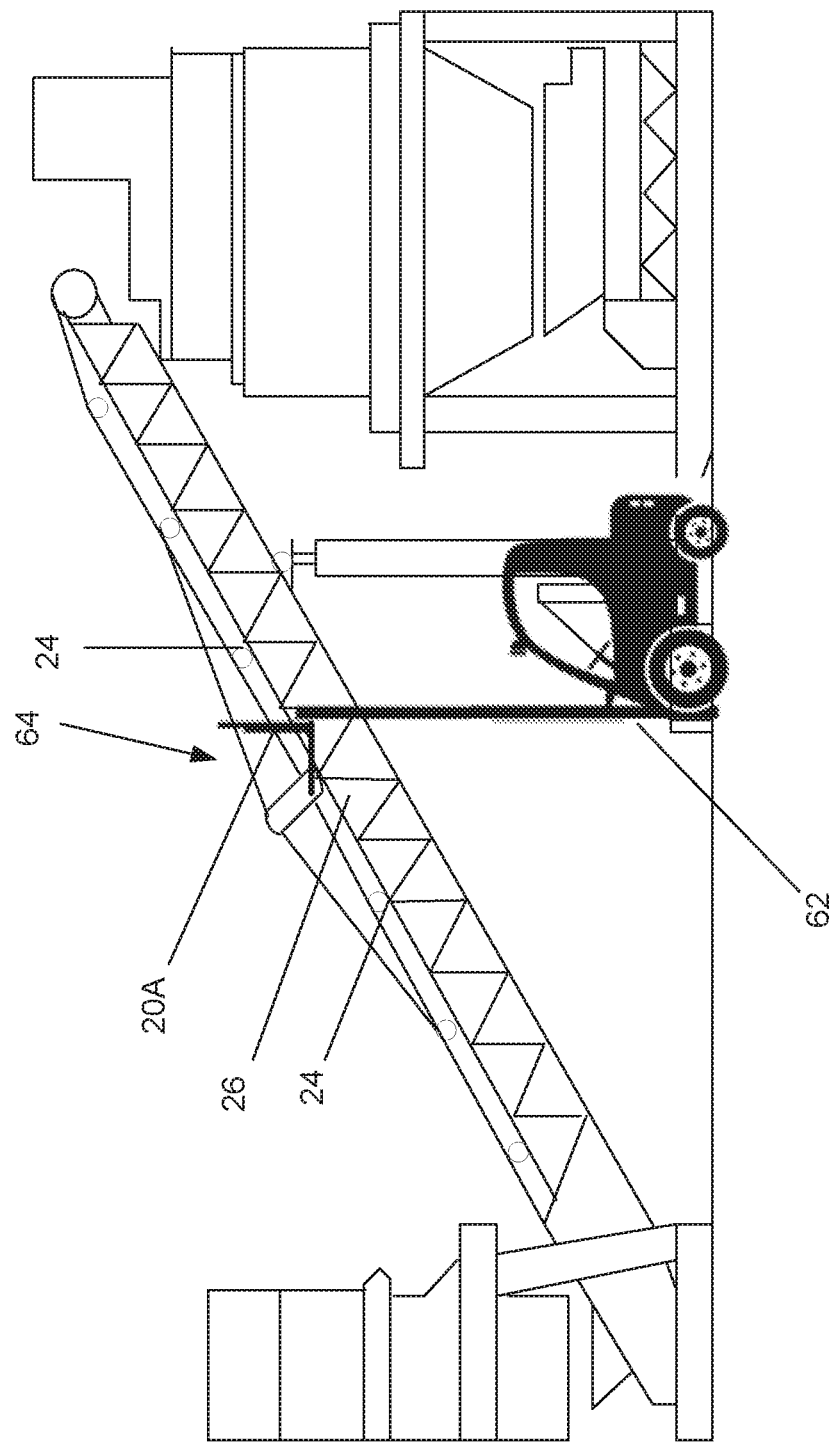
FIG. 6 illustrates a mobile discarding rail device positioned on a lift-car.

FIG. 6 illustrates a mobile D-rail 20A device positioned on a lift-car 62. The mobile lift cart 62 is a mobile automobile similar to a forklift. The mobile lift cart 62 includes a vertical lift similar to a forklift, but instead of a pronged support mechanism, the mobile lift cart 62 includes a mobile version of a D-rail 20A. In this manner, the mobile D-Rail 20A operates on similar principles as the statically placed D-Rail 20 but is driven around on a cart. When applying the mobile D-rail 20 to a conveyor structure 26, the mobile lift cart 62 drives up and inserts the mobile D-rail 20A in a gap 64 between two support rollers 24.

Figure 7:
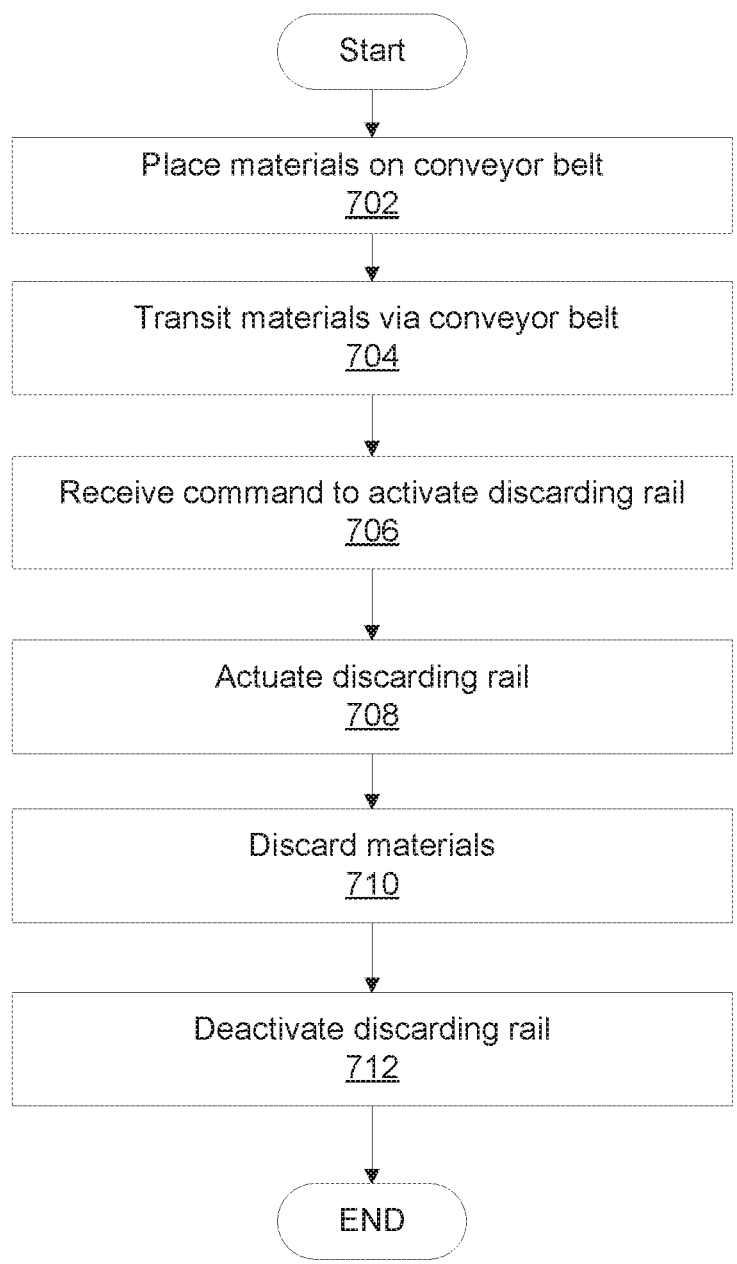
FIG. 7 is a flowchart of a process for a method of using the discarding rail system to unload waste material from the conveyor belt.

FIG. 7 is a flowchart of a process for a method of using the discarding rail system to unload waste material from the conveyor belt. In step 702, materials exit a first materials processor and are placed on the conveyor belt. In some embodiments the materials include rubble produced from larger chunks of material. In step 704, the conveyor belt transits the materials toward a second materials processor. In some embodiments, after being processed by the second materials processor the material on the conveyor belt is turned into aggregate.

In step 706, a discarding rail receives a command to actuate. In some embodiments, the discarding rail is mounted on the conveyor structure, and in other embodiments the discarding rail is mounted on a mobile lift cart and inserted into the conveyor structure. In step 708, an actuation mechanism of the discarding rail causes an upper portion of the discarding rail to actuate about a hinge. The actuate occurs in a direction perpendicular to the flow of materials on the conveyor belt. In step 710, the conveyor belt warps in response to the actuate of step 708. In step 710, materials on the conveyor belt proximate to the discarding rail are discarded by the gradient of the conveyor belt created via warping. In step 712, the discarding rail is deactivated, and the conveyor belt continues to operate normally.

Figure 8:
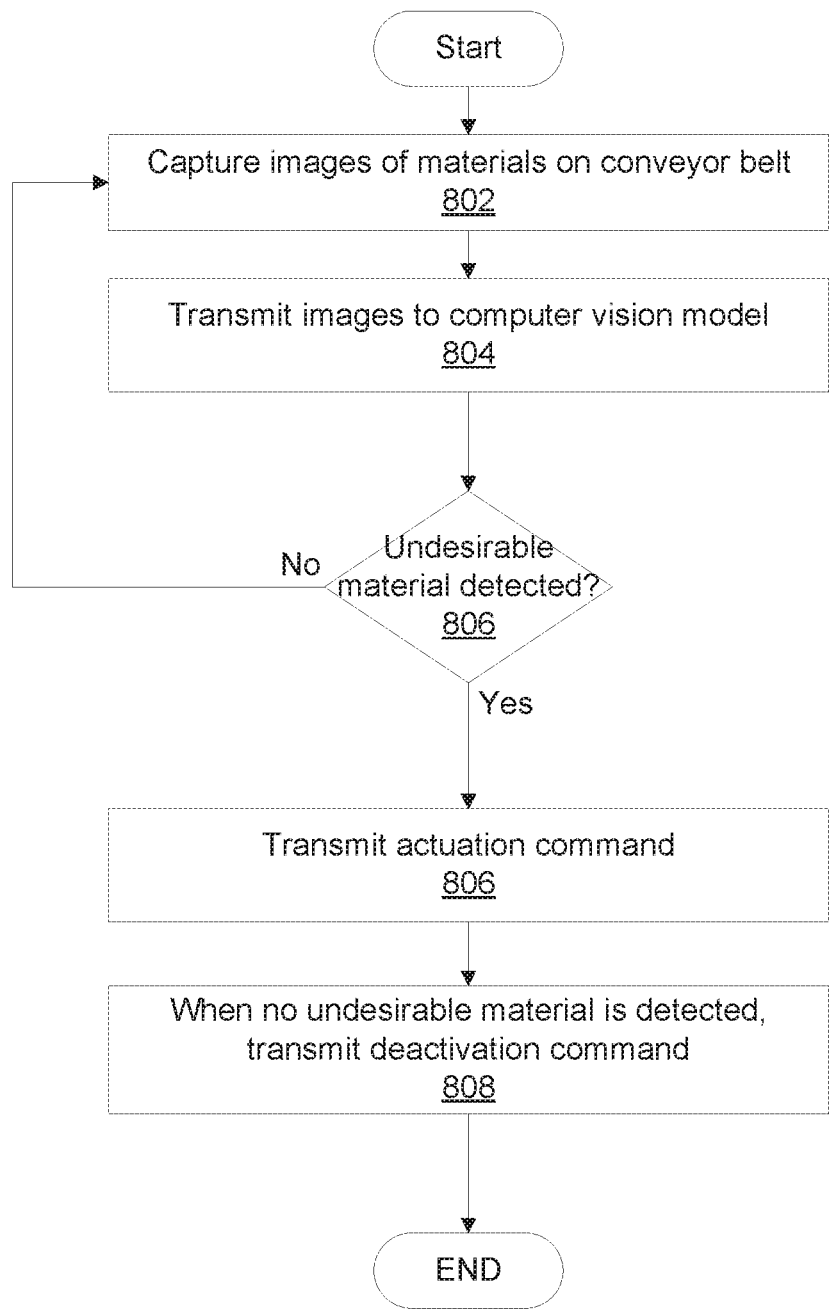
FIG. 8 is a flow chart illustrating a method of operating a mobile discarding rail.

FIG. 8 is a flow chart illustrating a method of automatically activating a discarding rail via computer vision. The method of FIG. 8 picks up from step 704. In step 802, a camera captures images or video of materials on the conveyor belt. In step 804, the captures from the camera are transmitted to a computer include computer vision software. In step 806, the computer vision algorithm determines whether the materials on the conveyor belt are undesirable. Undesirableness is determined by predetermined features of materials. And may be identified through machine learning/ neural network models trained from images of similar materials. Features of undesirable material may be identified by average rubble size, color, sedimentary or other rock patterns within the material. The model used is trained to find the graphic features on a binary basis (undesirable or not). The model makes use of a large plurality of images that are labeled based on undesirableness. The graphic features shared amongst those images that are undesirable enable the model to determine whether new, current images also contain undesirable materials. If undesirable materials are not identified, the computer vision algorithm moves on to a next set of images from the camera.

In step 808, when undesirable material is detected via computer vision analysis of camera output, the computer automatically transmits the command of step 706 of FIG. 7. In step 810, the computer vision algorithm no longer detects undesirable material on the conveyor belt, and the computer automatically transmits a command to the discard rail to deactivate (step 712).

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A materials discarding system comprising:
    a materials conveyor belt that transfers material toward a materials processor, wherein the materials conveyor belt is supported by a plurality of roller rails; and
    a discarding rail that supports the materials conveyor belt and actuates, wherein when actuated the discarding rail warps the materials conveyor belt and causes materials on the materials conveyor belt to slide off the materials conveyor belt at a position proximate to the discarding rail toward a predetermined location the discarding rail including: a long roller positioned adjacent to an actuating edge of the discarding rail and oriented horizontally to the materials conveyor belt; and a short roller positioned adjacent to a lifting edge of the discarding rail and oriented at an offset angle relative to a horizontal plane.

2. The materials discarding system of claim 1, wherein a roller rail of the plurality of roller rails includes rollers arranged in a "U" formation.

3. The materials discarding system of claim 1, wherein a first roller rail and a second roller rail positioned on either respective side of the discarding rail each include a retaining roller positioned adjacent to the actuating edge of the discarding rail and oriented at the offset angle relative to the materials conveyor belt, wherein while the discarding rail is actuated the retaining rollers funnel materials toward the long roller and off the materials conveyor belt.

4. The materials discarding system of claim 1, further including:
    an actuation mechanism of the discarding rail actuates via any combination of:
    a hydraulic piston;
    a screw drive;
    an electric drive; or
    a pneumatic drive.

5. The materials discarding system of claim 4, wherein the actuation mechanism is sealed into a compartment that reduces debris build-up on the actuation mechanism.

6. The materials discarding system of claim 1, further comprising:
a collection unit positioned at the predetermined location below the materials conveyor belt.

7. The materials discarding system of claim 1, wherein the discarding rail is positioned midway along the materials conveyor belt.

8. The materials discarding system of claim 1, further comprising:
a mobile lift cart to which the discarding rail is affixed, the mobile lift cart including an adjustable lift that positions the discarding rail vertically, wherein the mobile lift cart is configured to position the discarding rail within a gap in support of the materials conveyor belt.

9. The materials discarding system of claim 1, further comprising:
a remote control configured to cause the discarding rail to actuate from a distance.

10. The materials discarding system of claim 1, further comprising:
a camera mounted along the materials conveyor belt and aimed at a region of the materials conveyor belt that is warped via actuation of the discarding rail, wherein computer vision detection of undesirable materials on the materials conveyor belt performed on images captured by the camera causes the discarding rail to automatically actuate and discard said undesirable materials to the predetermined location.

11. A mobile lift cart configured to cause materials discarding from a materials conveyor belt that transfers material toward a materials processor, the mobile lift cart comprising:
an automotive cart base;
a vertical lift affixed to the automotive cart base operative to adjust vertical positioning of a discarding rail; and
the discarding rail that is configured to insert in between support gaps of the materials conveyor belt supports, the discarding rail including an actuation mechanism, wherein when actuated the discarding rail warps the materials conveyor belt and causes materials on the materials conveyor belt to slide off the materials conveyor belt at a position proximate to the discarding rail toward a predetermined location the discarding rail including: a long roller positioned adjacent to an actuating edge of the discarding rail and oriented horizontally to the materials conveyor belt; and a short roller positioned adjacent to a lifting edge of the discarding rail and oriented at an offset angle relative to a horizontal plane.

12. The mobile cart of claim 11, wherein the discarding rail further includes:
a long roller positioned adjacent to an actuating edge of the discarding rail and when inserted into materials conveyor belt is oriented horizontally relative to the materials conveyor belt; and
a short roller positioned adjacent to a lifting edge of the discarding rail and when inserted into materials conveyor belt is oriented at an offset angle relative to a horizontal plane.

13. The mobile cart of claim 11, wherein the actuation mechanism of the discarding rail actuates via any combination of:
a hydraulic piston;
a screw drive;
an electric drive; or
a pneumatic drive.

14. The mobile cart of claim 13, wherein the actuation mechanism is sealed into a compartment that reduces debris build-up on the actuation mechanism.

15. A method comprising,
shifting material toward a materials processor via a materials conveyor belt, wherein the materials conveyor belt is supported by a plurality of roller rails; and
actuating a discarding rail that supports the materials conveyor belt, wherein when actuated the discarding rail warps the materials conveyor belt and causes materials on the materials conveyor belt to slide off the materials conveyor belt at a position proximate to the discarding rail toward a predetermined location the discarding rail including: a long roller positioned adjacent to an actuating edge of the discarding rail and oriented horizontally to the materials conveyor belt; and a short roller positioned adjacent to a lifting edge of the discarding rail and oriented at an offset angle relative to a horizontal plane.

16. The method of claim 15, wherein a first roller rail and a second roller rail of the plurality of roller rails that are each positioned on either side of the discarding rail each include a retaining roller positioned adjacent to an actuating edge of the discarding rail and oriented at the offset angle relative to the materials conveyor belt, wherein while the discarding rail is actuated the retaining rollers funnel materials off the materials conveyor belt.

17. The method of claim 15, further comprising:
capturing images of materials on the materials conveyor belt via a camera aimed at the materials conveyor belt;
detecting undesired materials via computer vision analysis of the images; and
wherein said actuating is performed automatically in response to said detecting.

18. The method of claim 15, wherein said actuating the discarding rail is caused by an actuation mechanism including any combination of:
a hydraulic piston;
a screw drive;
an electric drive; or
a pneumatic drive.

19. The method of claim 15, further comprising:
receiving a remote control command configured to cause the discarding rail to actuate from a distance.

* * * * *